Patented Jan. 9, 1934

1,942,865

UNITED STATES PATENT OFFICE 1,942,865

AZODYESTUFF CONTAINING A NITROSOGROUP

Leopold Laska, Arthur Zitscher, Wilhelm Christ, and Adolf Petzold, Offenbach-on-the-Main, Germany, assignors to General Aniline Works, Inc., New York, N. Y., a corporation of Delaware No Drawing. Application November 12, 1928, Serial No. 318,992, and in Germany December 13, 1927

22 Claims. (Cl. 260—95)

Our invention relates to azodyestuffs containing a nitrosogroup in their molecule and to a process of making same. The new dyestuffs correspond probably to the general formula:

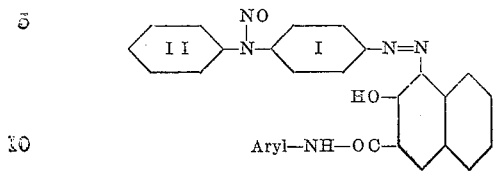

in which formula the naphthalene and the two benzene nuclei may contain further substituents other than a sulfonic or carboxylic acid group and the benzene nucleus signified by II may be replaced by a naphthalene nucleus.

They are obtained by combining in substance or upon a substratum a 4-diazo-N-nitrosodiarylamine compound not containing a sulfonic or carboxylic acid group and probably corresponding with the general formula:

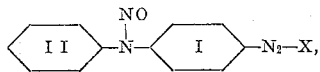

in which formula X means an anion and the two benzene nuclei may contain further substituents and the nucleus signified by II may be replaced by a naphthalene nucleus, with an arylide of 2.3-hydroxynaphthoic acid. The diazo-nitrosodiphenylamine compounds, which have not been used hitherto for the production of azo-dyestuffs insoluble in water, are distinguished by their particular capacity for combining and the stability of their solutions, a fact, which is of importance for producing ice colors by means of a standard bath. These diazonitrosodiphenylamine compounds may be obtained by the action of two molecular proportions of an alkali nitrite on one molecular proportion of an aminodiphenylamine compound in a mineral acid solution.

The new azo-dyestuffs insoluble in water thus obtainable are when dry red to garnet colored powders, soluble in concentrated sulfuric acid to a reddish violet to violet solution. When produced on the fiber they yield red to garnet to violet dyeings of a good fastness to chlorine and washing according to the character of the dyestuff produced.

Suitable for the present process are nitrosodiazo-compounds of 4-aminodiphenylamine itself and of its substitution products, such as 4-amino-2'-methyldiphenylamine, 4-amino-2'-methoxydiphenylamine, 4-amino-2'-ethoxydiphenylamine, 4-amino-2'-phenoxydiphenylamine, 4-amino-2'-chlorodiphenylamine, 4-amino-3'-methyldiphenylamine, 4-amino-3'-chlorodiphenylamine, 4-amino-4'-methyldiphenylamine, 4-amino-4'-methoxydiphenylamine, 4-amino-4'-ethoxydiphenylamine, 4-amino-4'-phenoxydiphenylamine, 4-amino-4'-chlorodiphenylamine, 4-amino-3-methyl-4'-methoxydiphenylamine, 4-amino-3'-methyl-6'-methoxydiphenylamine, 4-amino-2'-methyl-4'-chlorodiphenylamine, 4-amino-2'-methyl-5'-chlorodiphenylamine, 4-amino-3'-methyl-6'-chlorodiphenylamine, 4-amino-4'-methyl-3'-chlorodiphenylamine, 4-amino-2'-methoxy-4'-chlorodiphenylamine, 4-amino-3'.4'-dichlorodiphenylamine and 4-aminophenyl-β-naphthylamine.

As azocomponents there may be used, for instance, the 2.3-hydroxynaphthoylderivatives of aniline, of toluidines, of aminoethylbenzenes, of the alkyl-, aralkyl- and aryl-ethers of aminophenols, of aminophenylketones, -sulfones and -sulfamines, of the halogensubstitution products of the aforesaid compounds, of naphthylamines and their derivatives, of arylenediamines, diaminodiaryls and their derivatives, diamines, in which two arylradicals are united by a further complex, further such arylamides of 2.3-hydroxynaphthoic acid containing further substituents with the exception of sulfonic or carboxylic acid group in the hydroxynaphthoyl-radical such as arylamides of 6-bromo-2.3-hydroxynaphthoic acid.

In order to further illustrate our invention the following examples are given, the parts being by weight and all temperatures in centigrade degrees, but we wish it to be understood that we are not limited to the particular products or reaction conditions mentioned therein.

Example 1

21.4 parts of 4-amino-4'-methoxy-diphenylamine are diazotized with 57 parts of hydrochloric acid 20° Bé., 500 parts of water and 15.2 parts of sodium nitrite at about 5–10°, whereby also a nitrosogroup is introduced. The free mineral acid is nearly neutralized with sodium acetate and the solution of the 4'-methoxy-N-nitrosodiphenylamine-4-diazonium chloride thus obtained as allowed to run at about 5–10° into a suspension obtained by dissolving 26.3 parts of the anilide of 2.3-hydroxynaphthoic acid in a sufficient quantity of a caustic soda solution with the addition of Turkey red oil and precipitating the solution by adding acetic acid. When the combination is finished the separated dyestuff is filtered off, washed and dried. It represents when dry a garnet like powder, soluble in concentrated sulfuric acid with a violet-red color turning to bluish green when standing. The new dyestuff thus formed corresponds probably to the formula:

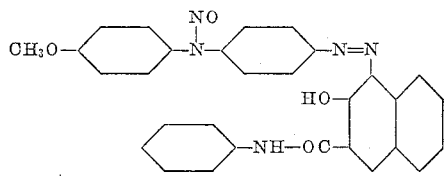

In order to produce this dyestuff on the vegetable fiber one may proceed as follows:

6 grs. of the anilide of 2.3-hydroxynaphthoic acid are well ground with 6 ccm. of Turkey red oil and 9 ccm. of a caustic soda solution of 34° Bé. and they are dissolved by adding 90 ccm. of boiling water, then 90 ccm. of cold water, and at about 45° C. 6 ccm. of formaldehyde of 33% are added. After about 5 to 10 minutes the whole is made up with cold water to 1 liter of liquor.

The cotton yarn is handled at about 30° for half an hour in this padding solution, centrifuged and then developed in the following bath:

2.63 grs. of 4-amino-4'-methoxydiphenylamine sulfate are mixed with 10 ccm. of hot water and 3 ccm. of hydrochloric acid of 20° Bé., then 50 ccm. of ice water and 1.42 grs. of sodiumnitrite are added and the mass is allowed to stand for half an hour while stirring. Then 2.5 grs. of magnesium sulfate or the corresponding amount of zinc sulfate dissolved in water and 1 gr. of sodium bicarbonate are added and the whole is made up with cold water to 1 liter of liquor.

The padded material is treated in this developing solution for half an hour and well rinsed. A garnet dyeing is thus obtained. The dyestuff thus produced on the fiber is identical with the dyestuff of the aforesaid formula.

*Example 2*

Well boiled cotton yarn is impregnated with a solution containing 4 grs. of 2.3-hydroxynaphthoyl-4-chloroaniline, 10 ccm. of Turkey red oil and 8 ccm. of a caustic soda solution of 34° Bé. and well wrung out. 22.8 grs. of 4-amino-4'-ethoxydiphenylamine are diazotized with addition of a sufficient amount of diluted hydrochloric acid and 14 grs. of sodium nitrite simultaneously the nitrosocompound being formed, and the mass of diazotization is diluted until a concentration of a hundredth mol of diazocompound in the liter.

To this solution of 4-diazo-4'-ethoxy-N-nitrosodiphenylamine an amount of sodium bicarbonate until an almost neutral reaction is added and the impregnated cotton yarn is therein developed, then cold and hot rinsed.

In this manner a garnet like dyeing of the dyestuff corresponding probably to formula:

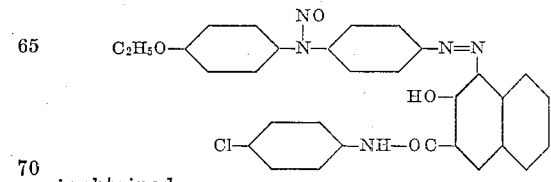

is obtained.

*Example 3*

Well boiled cotton yarn is impregnated with a solution containing 6 grs. of 2.3-hydroxynaphthoyl-4-toluidine, 8 ccm. of Turkey red oil and 12 ccm. of a caustic soda solution of 34° Bé. in the liter and well wrung out. 21.4 grs. of 4-amino-4'-methoxyliphenylamine are diazotized in the manner as described in Example 2 with 14 grs. of sodiumnitrite and the diazosolution is made up until a concentration of 1 hundredth mol of the diazocompound in the liter.

When developing the padded cotton yarn with this N-nitroso-diazosolution neutralized with carbonate of calcium a reddish brown dyeing of a dyestuff, corresponding probably to the formula:

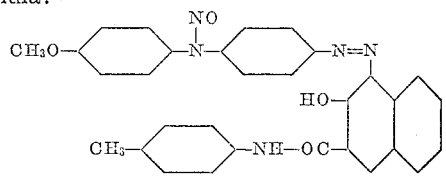

is obtained.

*Example 4*

Woolen muslin is impregnated with a solution containing:

5 grs. of 2.3-hydroxynaphthoyl-4-toluidine, 5 ccm. of Turkey red oil and 7.7 ccm. of a caustic soda solution of 34° Bé. in the liter, centrifuged and intermediately rinsed for 5–10 minutes with a solution containing 30 grs. of common salt in the liter, and then again well dehydrated.

The material is developed with a solution containing a hundredth mol of 4-diazo-4'-ethoxy-N-nitroso-diphenylamine in the liter to which solution sodium acetate is added and after soaping the material at about 45° with a solution containing 5 grs. of a neutral soap in the liter and rinsing it a full garnet like dyeing of the dyestuff

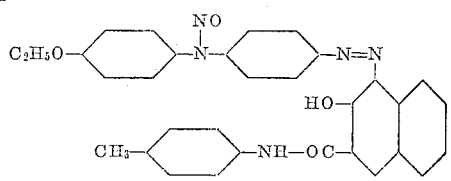

is obtained.

*Example 5*

3 grs. of 2.3-hydroxynaphthoyl-4-toluidine are dissolved with 6 ccm. of a caustic soda solution of 34° Bé. and 3 ccm. of Turkey red oil with addition of 3 ccm. of formaldehyde and of one of the usual protective agents, for instance, 3 grs. of Protectol I double powder (cf. Colour Index, 1924, page 363) to one liter of a padding solution.

Silk yarn is impregnated with this solution at about 25° for a quarter of an hour, then 10 grs. of common salt are added per liter of liquor and the yarn is well dehydrated.

It is developed in a bath neutralized with sodium acetate and containing an amount of a diazonitrosocompound corresponding to 1.25 grs. of 4-amino-4'-methoxy-diphenylamine after addition of 5 ccm. of an acetic acid of 50% and 10 grs. of common salt per liter.

The dyestuff thus produced on the fiber is identical with the dyestuff produced on cotton yarn according to Example 3.

EXAMPLE 6

1. *Padding solution*

15 grs. of 2.3-hydroxynaphthoyl-4-chloroaniline are well ground with 20 ccm. of Turkey red oil and 24 ccm. of a caustic soda solution of 34° Bé. and they are dissolved by adding 250 grs. of boiling water and boiling again the mass. Then the whole is made up with cold water to 1 liter.

2. Developing bath 16 grs. of 4-amino-4'-methoxydiphenylamine sulfate are stirred with 75 ccm. of hot water and 25 ccm. of hydrochloric acid of 20° Bé., then 500 grs. of ice water and 8.5 grs. of sodium nitrite are added and the mass is allowed to stand for half an hour while stirring. Then 15 grs. of sodium acetate dissolved in water are added and the whole is made up with cold water to 1 liter.

The cotton piece goods are impregnated on a slop-padding machine with the aforesaid solution, squeezed out and intermediately dried in a given case.

Then the piece goods are developed on a padding machine at about 10° in the aforesaid developing bath and well rinsed. In this manner a deep red dyeing is obtained the produced dyestuff corresponding probably to the formula:

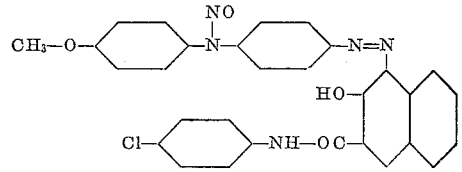

In the following table there are cited some further components suitable for the combination according to our process and the shades of dyeings obtained by the production on the fiber of the new dyestuffs which contain a nitrosogroup in their molecule:

| Diazo-nitroso-compound of | Combined with | Shade of dyeing obtained |
|---|---|---|
| 4-aminodiphenylamine | 2.3 - hydroxynaphthoyl - 2 - chloroaniline | Dark violet |
| Do | 2.3 - hydroxynaphthoyl - 4 - chloroaniline | Do. |
| Do | 2.3 - hydroxynaphthoyl - 2 - phenetidine | Do. |
| Do | 2.3 - hydroxynaphthoyl - 1 - naphthylamine | Do. |
| Do | 2.3 - hydroxynaphthoyl - 4 - chloro-2-anisidine | Do. |
| Do | 2.3 - hydroxynaphthoyl - 5 - chloro-2-anisidine | Do. |
| Do | 2.3 - hydroxynaphthoyl - 2 - aminodiphenyl-ether | Garnet |
| Do | 2.3 - hydroxynaphthoyl - 4 - aminophenylbenzylether | Garnet-brown |
| Do | Di - (2.3 - hydroxynaphthoyl)- 4.4' - diamino - 2.2'.5.5' - tetrachloro-diphenylurea | Do. |
| Do | Bis - 2.3 - hydroxynaphthoyl - dianisidine | Garnet |
| 4 - amino - 2' - methyl - diphenylamine | 2.3-hydroxynaphthoyl-amino-hydroquinonedimethylether | Do. |
| Do | 2.3 - hydroxynaphthoyl - 5 - chloro-2-anisidine | Do. |
| Do | 2.3 - hydroxynaphthoyl - 2 - amino - 3 - naphtholmethyl-ether | Do. |
| 4 - amino - 2' - methoxy-diphenylamine | 2.3 - hydroxynaphthoyl - 4 - toluidine | Dark violet |
| Do | 2.3 - hydroxynaphthoyl - 3 - phenetidine | Do. |
| Do | 2.3 - hydroxynaphthoyl - 2 - naphthylamine | Do. |
| Do | 2.3 - hydroxynaphthoyl - 2 - amino-ethyl-benzene | Do. |
| Do | 2.3 - hydroxynaphthoyl - 2 - amino - 3 - naphtholmethyl-ether | Garnet |
| 4 - amino - 2' - ethoxy-diphenylamine | 2.3 - hydroxynaphthoyl - 3 - chloroaniline | Dark violet |
| Do | 2.3 - hydroxynaphthoyl - 2 - naphthylamine | Do. |
| Do | 2.3 - hydroxynaphthoyl - 4 - chloro-2-anisidine | Do. |
| Do | 2.3 - hydroxynaphthoyl - 2 - amino - 4 - chloro - 1 - ethyl-benzene | Do. |
| 4 - amino - 2' - phenoxy-diphenylamine | 2.3 - hydroxynaphthoyl - 4 - toluidine | Dark violet |
| Do | 2.3 - hydroxynaphthoyl - 2 - phenetidine | Do. |
| Do | 2.3 - hydroxynaphthoyl - 3 - chloroaniline | Do. |
| 4 - amino - 2' - chloro - diphenylamine | 2.3 - hydroxynaphthoyl - 3 - nitroaniline | Reddish dark violet |
| Do | 2.3 - hydroxynaphthoyl - 4 - chloroaniline | Do. |
| Do | 2.3 - hydroxynaphthoyl - 4 - amino-1-ethylbenzene | Do. |
| Do | 2.3 - hydroxynaphthoyl - 1 - naphthylamine | Do. |
| 4 - amino - 3' - methyl - diphenylamine | 2.3 - hydroxynaphthoyl - 2 - chloroaniline | Garnet |
| Do | 2.3 - hydroxynaphthoyl - 5 - chloro-2-anisidine | Do. |
| 4 - amino - 3' - chloro - diphenylamine | 2.3 - hydroxynaphthoyl - 3 - toluidine | Dark violet |
| Do | 2.3 - hydroxynaphthoyl - 2 - phenetidine | Do. |
| Do | 2.3 - hydroxynaphthoyl - 2 - amino - 3 - naphtholmethyl-ether | Do. |
| 4 - amino - 4' - methyl - diphenylamine | 2.3 - hydroxynaphthoyl - 4 - toluidine | Garnet |
| Do | 2.3 - hydroxynaphthoyl - 4 - chloroaniline | Do. |
| Do | 2.3 - hydroxynaphthoyl - 5 - chloro-2-toluidine | Do. |
| Do | 2.3 - hydroxynaphthoyl - 2 - naphthylamine | Do. |
| 4 - amino - 4' - methoxy-diphenylamine | 2.3 - hydroxynaphthoyl - 2 - toluidine | Do. |
| Do | 2.3 - hydroxynaphthoyl - 4 - anisidine | Do. |
| Do | 2.3 - hydroxynaphthoyl - 3 - chloroaniline | Do. |
| Do | 2.3 - hydroxynaphthoyl - 2 - naphthylamine | Do. |
| 4 - amino - 4' - methoxy-diphenylamine | 2.3 - hydroxynaphthoyl - 3 - amino-acetophenone | Claret |
| Do | 2.3 - hydroxynaphthoyl - 3 - amino - 4 - methoxybenzene-sulfonic acid - dimethylamide | Do. |
| Do | 2.3 - hydroxynaphthoyl - 2 - amino - tolyl - 4 - ethylsulfone | Do. |
| Do | 6 - bromo - 2.3 - hydroxynaphthoylanilide | Dark violet |
| Do | 6 - bromo - 2.3 - hydroxynaphthoyl - 5 - chloro - 2 - anisidine | Do. |
| 4 - amino - 4' - ethoxy-diphenylamine | 2.3 - hydroxynaphthoyl - aniline | Garnet |
| Do | 2.3 - hydroxynaphthoyl - 2 - toluidine | Do. |
| Do | 2.3 - hydroxynaphthoyl - 3 - toluidine | Do. |
| Do | 2.3 - hydroxynaphthoyl - 4 - anisidine | Do. |
| Do | 2.3 - hydroxynaphthoyl - 3 - chloroaniline | Do. |
| Do | 2.3 - hydroxynaphthoyl - 2 - naphthylamine | Do. |
| Do | 6 - bromo - 2.3 - hydroxynaphthoyl-2-anisidine | Dark violet |
| Do | 6 - bromo - 2.3 - hydroxynaphthoyl-1-naphthylamine | Dark garnet |
| Do | Di - (2.3 - hydroxynaphthoyl)- 2.5 - diamino - 4 - methoxy - 1-toluene | Reddish brown |
| Do | Di - (2.3 - hydroxynaphthoyl)- 4.4' - diamino - 2.2' - dimethyl-diphenyl-methane | Garnet |
| Do | Di - (2.3 - hydroxynaphthoyl) - 4.4'-diaminobenzophenone | Reddish garnet |
| 4 - amino - 4' - chloro - diphenylamine | 2.3 - hydroxynaphthoyl - 2 - anisidine | Dark violet |
| Do | 2.3 - hydroxynaphthoyl - 4 - anisidine | Do. |
| Do | 2.3 - hydroxynaphthoyl - 5 - chloro-2-anisidine | Do. |
| Do | 2.3 - hydroxynaphthoyl - 2 - naphthylamine | Do. |
| Do | 2.3 - hydroxynaphthoyl - 2 - amino - 3 - naphtholmethyl-ether | Do. |
| 4 - amino - 4' - phenoxy-diphenylamine | 2.3 - hydroxynaphthoyl - 4 - phenetidine | Do. |
| Do | 2.3 - hydroxynaphthoyl - 4 - chloroaniline | Do. |
| Do | 2.3 - hydroxynaphthoyl - 1 - naphthoylamine | Do. |
| 4 - amino - 3 - methyl - 4' - methoxy - diphenylamine | 2.3 - hydroxynaphthoyl - aniline | Garnet |
| Do | 2.3 - hydroxynaphthoyl - 4 - chloroaniline | Do. |
| Do | 2.3 - hydroxynaphthoyl - 2 - naphthylamine | Do. |

| Diazo-nitroso-compound of | Combined with | Shade of dyeing obtained |
|---|---|---|
| 4 - amino - 3 - methyl - 4' - methoxy - di - phenylamine | 2.3 - hydroxynaphthoyl - 4 - anisidine | Garnet |
| Do | 2.3 - hydroxynaphthoyl - 2 - toluidine | Bluish garnet |
| Do | 2.3 - hydroxynaphthoyl - 2 - chloroaniline | Do. |
| Do | 2.3 - hydroxynaphthoyl - 3 - chloroaniline | Do. |
| 4 - amino - 3' - methyl - 6' - methoxy - di - phenylamine | 2.3 - hydroxynaphthoyl - 3 - toluidine | Dark violet |
| Do | 2.3 - hydroxynaphthoyl - 5 - chloro-2-anisidine | Garnet |
| Do | 2.3 - hydroxynaphthoyl - 1 - naphthylamine | Do. |
| 4 - amino - 2' - methyl - 4' - chloro - diphenyl- amine | 2.3 - hydroxynaphthoyl - 3 - toluidine | Do. |
| Do | 2.3 - hydroxynaphthoyl - 3 - nitroaniline | Do. |
| Do | 2.3 - hydroxynaphthoyl - amino hydroquinonedimethyl - ether | Do. |
| 4 - amino - 2' - methyl - 5' - chloro - diphenyl- amine | 2.3 - hydroxynaphthoyl - 4 - toluidine | Dark violet |
| Do | 2.3 - hydroxynaphthoyl - 1 - naphthylamine | Do. |
| Do | 2.3 - hydroxynaphthoyl - 2 - naphthylamine | Garnet |
| 4 - amino - 3' - methyl - 6' - chloro - diphenyl- amine | 2.3 - hydroxynaphthoyl - 5 - chloro-2-anisidine | Do. |
| Do | 2.3 - hydroxynaphthoyl - 2 - amino - 4 - chloro - 1 - ethyl- benzene | Claret |
| Do | 2.3 - hydroxynaphthoyl - 1 - naphthylamine | Garnet |
| 4 - amino - 4' - methyl - 3' - chloro - diphenyl- amine | 2.3 - hydroxynapthoylaniline | Dark violet |
| Do | 2.3 - hydroxynaphthoyl - 2 - toluidine | Do. |
| Do | 2.3 - hydroxynaphthoyl - 4 - toluidine | Do. |
| 4 - amino - 2' - methoxy - 4' - chloro - diphenyl- amine | 2.3 - hydroxynaphthoyl - amino - hydroquinonedi - methylether | Claret |
| Do | 2.3 - hydroxynaphthoyl - 2 - naphthylamine | Do. |
| Do | 2.3 - hydroxynaphthoyl - 2 - amino - 3 - naphtholmethy - ether | Garnet |
| 4 - amino - 3 - methoxy - 6.2' - dimethyl - 4' - chloro - diphenylam- ine | 2.3 - hydroxynapthoyl - p - chloroaniline | Brownish- garnet |
| Do | 2.3 - hydroxynaphthoyl - 2 - naphthylamine | Do. |
| 4 - amino - 3',4' - dichlorodiphenylamine | 2.3 - hydroxynaphthoyl-ani- line | Dark violet |
| Do | 2.3 - hydroxynaphthoyl - 3 - toluidine | Do. |
| Do | 2.3 - hydroxynaphthoyl - 3 - anisidine | Do. |
| 4 - amino - phenyl - β - naphthylamine | 2.3 - hydroxynaphthoyl - ani- line | Do. |
| Do | 2.3 - hydroxynaphthoyl - p - anisidine | Do. |
| Do | 2.3 - hydroxynaphthoyl - m - chloroaniline | Do. |
| 4 - amino - 3.2' - di - methoxy - diphenyl - amine | 2.3 - hydroxynaphthoyl - 1 - naphthylamine | Dark gar- net |
| Do | 2.3 - hydroxynaphthoyl - 2 - naphthylamine | Do. |
| Do | 2.3 - hydroxynaphthoyl - 4 - chloroaniline | Do. |
| Do | 2.3 - hydroxynaphthoyl - 5 - chloro-2-toluidine | Garnet |
| Do | 2.3 - hydroxynaphthoyl - ami- nohydroquinone - dimethyl- ether | Do. |
| 4 - amino - 3.2' - di methyl - diphenylam - ine | 2.3 - hydroxynaphthoyl - ani- line | Garnet like claret |
| Do | 2.3 - hydroxynaphthoyl - 2 - naphthylamine | Do. |
| Do | 2.3 - hydroxynaphthoyl - 2 - toluidine | Do. |
| Do | 2.3 - hydroxynaphthoyl - 2 - anisidine | Do. |
| Do | 2.3 - hydroxynaphthoyl - 4 - chloroaniline | Do. |
| 4 - amino - 3.2' - di - chloro - diphenyl - amine | 2.3 - hydroxynaphthoyl - ani- line | Deep blue gar- net |
| Do | 2.3 - hydroxynaphthoyl - 2 - naphthylamine | Do. |
| Do | 2.3 - hydroxynaphthoyl - 5 - chloro-2-toluidine | Do. |
| Do | 2.3 - hydroxynaphthoyl - ami- nohydroquinone - dimethyl- ether | Do. |

The dyestuffs forming the subject of the present invention can be also produced by a printing process according to one of the usual methods.

In the following claims we understand under the "combining" process the combination of the components in substance as well as on a substratum, particularly on the fiber.

We claim:

1. The azodyestuffs containing a nitrosogroup and corresponding probably to the general formula:

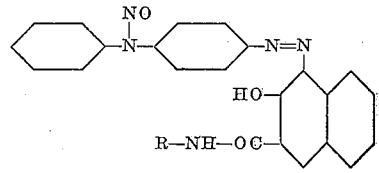

in which formula the naphthalene nucleus may contain a halogen and the two benzene nuclei halogen, alkyl-, oxalkyl- or oxaryl-groups, and R stands for a radical of the benzene or naphthalene series, which dyestuffs are when dry red-like claret to garnet colored powders, soluble in concentrated sulfuric acid with a reddish-violet to violet color, forming valuable color lakes when mixed with the usual substrata and yielding claret to garnet-like reddish to violet dyeings of a good fastness to chlorine and washing when produced on the fiber.

2. Fiber dyed with the dyestuffs claimed in claim 1.

3. A process which comprises combining an N-nitroso-diphenylamine-4-diazonium salt of the general formula:

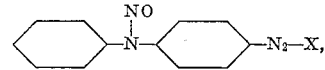

in which formula X means an acid radical of the salt and the two benzene nuclei may contain halogen, alkyl- oxalkyl- or oxarylgroups, with an arylamide of 2.3-hydroxynaphthoic acid, the aryl radical of which is of the benzene or naphthalene series, the naphthalene nucleus of which may contain a halogen atom.

4. The azodyestuffs containing a nitrosogroup and corresponding probably to the general formula:

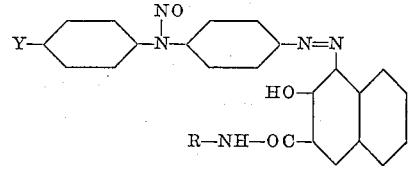

in which formula Y means a substituent of the group consisting of halogen, alkyl, oxalykl and oxaryl, and the two benzene nuclei may contain further substituents of the same group and the naphthalene nucleus a halogen atom, and R stands for a radical of the benzene or naphthalene series, which dyestuffs are when dry red-like claret to garnet colored powders, soluble in concentrated sulfuric acid with a reddish-violet to violet color, forming valuable color lakes when mixed with the usual substrata and yielding claret to garnet-like reddish to violet dyeings of a good fastness to chlorine and washing when produced on the fiber.

5. Fiber dyed with the dyestuffs claimed in claim 4.

6. A process which comprises combining an

N-nitroso-diphenylamine-4-diazonium salt of the general formula:

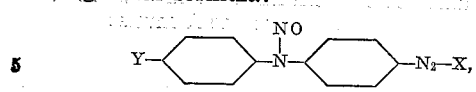

in which formula X means an acid radical of the salt and Y a substituent of the group consisting of halogen, alkyl, oxalkyl and oxaryl, and the two benzene nuclei may contain further substituents of the same group, with an arylamide of 2.3-hydroxynaphthoic acid, the aryl radical of which is of the benzene or naphthalene series, the naphthalene nucleus of which may contain a halogen atom.

7. The azodyestuffs containing a nitrosogroup and corresponding probably to the general formula:

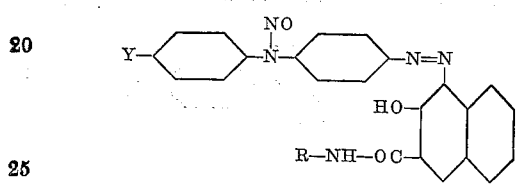

in which formula Y means a substituent of the group consisting of halogen, alkyl, oxalkyl and oxaryl, and R stands for a radical of the benzene or naphthalene series, which dyestuffs are when dry red-like claret to garnet colored powders, soluble in concentrated sulfuric acid with a reddish-violet to violet color, forming valuable color lakes when mixed with the usual substrata and yielding claret to garnet-like reddish to violet dyeings of a good fastness to chlorine and washing when produced on the fiber.

8. Fiber dyed with the dyestuffs claimed in claim 7.

9. A process which comprises combining an N-nitroso-diphenylamine-4-diazonium salt of the general formula:

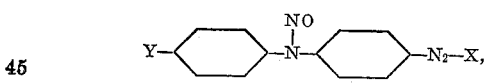

in which formula X means an acid radical of the salt and Y a substituent of the group consisting of halogen, alkyl, oxalkyl and oxaryl, with an arylamide of 2.3-hydroxynaphthoic acid, the aryl radical of which is of the benzene or naphthalene series.

10. The azodyestuffs containing a nitrosogroup and corresponding probably to the general formula:

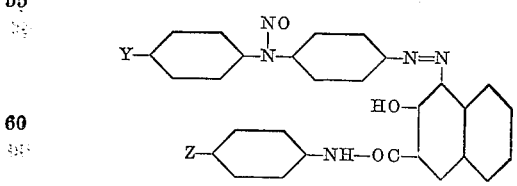

in which formula Y means a substituent of the group consisting of halogen, alkyl, oxalkyl and oxaryl, and Z a substituent of the group consisting of halogen, alkyl and oxalkyl, which dyestuffs are when dry red-like claret to garnet colored powders, soluble in concentrated sulfuric acid with a reddish-violet to violet color, forming valuable color lakes when mixed with the usual substrata and yielding claret to garnet-like reddish to violet dyeings of a good fastness to chlorine and washing when produced on the fiber.

11. Fiber dyed with the dyestuffs claimed in claim 10.

12. A process which comprises combining an N-nitroso-diphenylamine-4-diazonium salt of the general formula:

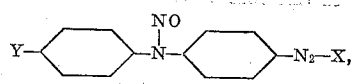

in which formula X means an acid radical of the salt and Y a substituent of the group consisting of halogen, alkyl, oxalkyl and oxaryl, with an arylamide of 2.3-hydroxynaphthoic acid of the formula:

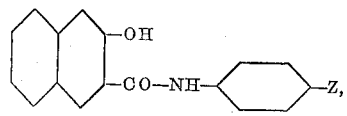

wherein Z is a substituent of the group consisting of halogen, alkyl and oxalkyl.

13. The azodyestuffs containing a nitrosogroup and corresponding probably to the formula:

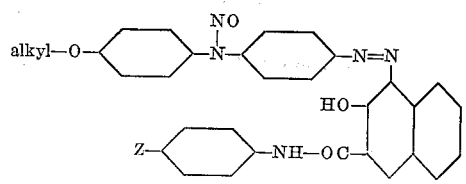

in which formula Z means a substituent of the group consisting of halogen, alkyl and oxalkyl, which dyestuffs are when dry red-like claret to garnet colored powders, soluble in concentrated sulfuric acid with a reddish-violet to violet color, forming valuable color lakes when mixed with the usual substrata and yielding claret to garnet-like reddish to violet dyeings of a good fastness to chlorine and washing when produced on the fiber.

14. Fiber dyed with the dyestuffs claimed in claim 13.

15. A process which comprises combining an 4'-alkoxy-N-nitroso-diphenylamine-4-diazonium salt of the formula:

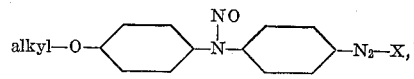

in which formula X means an acid radical of the salt, with an arylamide of 2.3-hydroxynaphthoic acid of the formula:

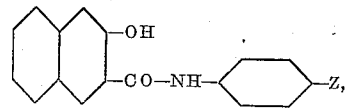

wherein Z is a substituent of the group consisting of halogen, alkyl or oxalkyl.

16. The azodyestuff containing a nitrosogroup and corresponding probably to the formula:

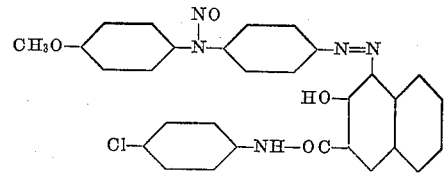

which dyestuff is when dry a garnet colored powder, soluble in concentrated sulfuric acid with a violet color, forming valuable color lakes when mixed with the usual substrata and yielding garnet like dyeings of a good fastness to chlorine and washing when produced on the fiber.

17. Fiber dyed with the dyestuff claimed in claim 16.

18. A process which comprises combining an

4'-methoxy-N-nitroso-diphenylamine - 4 - diazonium salt of the formula:

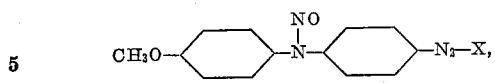

wherein X means an acid radical of the salt, with 2.3-hydroxynaphthoyl-4-chloro-aniline.

19. The azodyestuff containing a nitrosogroup and corresponding probably to the formula:

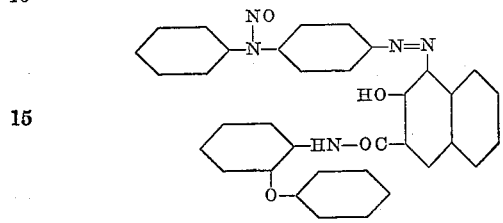

which dyestuff is when dry a garnet colored powder, forming valuable color lakes when mixed with the usual substrata and yielding garnet dyeings when produced on the fiber.

20. The azodyestuff containing a nitrosogroup and corresponding probably to the formula:

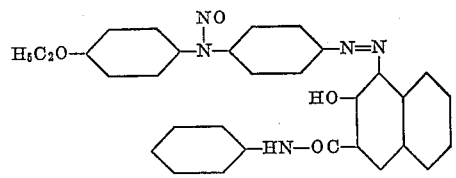

which dyestuff is when dry a garnet colored powder, forming valuable color lakes when mixed with the usual substrata and yielding garnet dyeings when produced on the fiber.

21. Fiber dyed with the dyestuff claimed in claim 19.

22. Fiber dyed with the dyestuff claimed in claim 20.

LEOPOLD LASKA.
ARTHUR ZITSCHER.
WILHELM CHRIST.
ADOLF PETZOLD.